(12) United States Patent
Chow et al.

(10) Patent No.: US 7,853,995 B2
(45) Date of Patent: Dec. 14, 2010

(54) SHORT-LIVED CERTIFICATE AUTHORITY SERVICE

(75) Inventors: Trevin Chow, Redmond, WA (US); Winfred Wong, Redmond, WA (US); Yordan Rouskov, Kirkland, WA (US); Kok Wai Chan, Bellevue, WA (US); Wei Jiang, Redmond, WA (US); Colin Chow, Bellevue, WA (US); Sanjeev Nagvekar, Redmond, WA (US); Matt Sullivan, New York, NY (US); Dilip Pai, Bellevue, WA (US); Kalyan Sayyaparaju, Redmond, WA (US); Avinash Belur, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 1398 days.

(21) Appl. No.: 11/282,174

(22) Filed: Nov. 18, 2005

(65) Prior Publication Data
US 2007/0118875 A1    May 24, 2007

(51) Int. Cl.
*G06F 7/04* (2006.01)
*G06F 15/16* (2006.01)
*G06F 17/30* (2006.01)

(52) U.S. Cl. ............................ 726/10; 726/18; 726/19; 713/175

(58) Field of Classification Search ................. 713/175; 726/10, 18, 19
See application file for complete search history.

(56) References Cited

U.S. PATENT DOCUMENTS

| 6,510,523 | B1 * | 1/2003 | Perlman et al. | 726/6 |
| 7,340,600 | B1 * | 3/2008 | Corella | 713/155 |
| 2005/0039008 | A1 * | 2/2005 | Bhatia et al. | 713/170 |
| 2005/0108526 | A1 * | 5/2005 | Robertson | 713/166 |
| 2007/0074019 | A1 * | 3/2007 | Seidel | 713/156 |
| 2008/0010448 | A1 * | 1/2008 | Sabnis et al. | 713/156 |

* cited by examiner

*Primary Examiner*—Christopher J Brown
(74) *Attorney, Agent, or Firm*—Lee & Hayes, PLLC

(57) ABSTRACT

An integrated authentication service is described which may receive a bundled request from one or more clients. One or more of the described techniques may be utilized to provide, in response to a single bundled request, a token for proof of identity and a certificate for establishing secure communications.

20 Claims, 7 Drawing Sheets

SHORT-LIVED CERTIFICATE AUTHORITY SERVICE

BACKGROUND

Users may seek to share a wide range of information via a network. For example, users may desire to share photos, applications, communications and so forth. Because the users often desire secure exchange of information, security protocols for exchange of information between users have been developed.

A traditional technique is to utilize a Certificate Authority to issue a certificate to users. The respective certificates of each user may be used with standard techniques to establish secure transactions between the users. For example, security support protocols such as Secure Channel (Schannel) which implements Transport Layer Security (TLS) and Secure Socket Layer (SSL) may utilize the respective certificates of users to establish an authenticated secure session.

However, as the number of users desiring secure exchange options has increased, so has the burden on Certificate Authorities which provide and maintain certifications. Numerous transactions which add to network traffic are required to issue, provision, maintain and revoke certifications even to the point where failures may be encountered due to overburdening of a Certificate Authority. This may disrupt users attempting to engage in secure exchange of information using the Certificate Authority. Therefore, this technique may result in user frustration and is burdensome not only to the user, but also the network and computing resources utilized to provide certifications.

SUMMARY

An integrated authentication service is described which, in response to a bundled request, authenticates a client and issues to the client a token and a certificate. The token may be provided by a client seeking access to resources from a plurality of service providers, such that, the token serves as proof of identity at each of the plurality of service providers. The certificate may be used by the client to establish secure communications with other clients. In an implementation, certificates issued by an authentication service may be short-lived certificates, which have limited validity periods and may be managed without using certificate revocation lists.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The same reference numbers are utilized in instances in the discussion to reference like structures and components.

DETAILED DESCRIPTION

Overview

An integrated authentication service is described. Traditionally, authentication services operate separately from certificate authorities, thereby requiring multiple requests to obtain an authentication token for proof or identity to a service provider and a certificate for establishing secure communications. Accordingly, techniques are described in which an authentication service may integrate authentication and certification to provide a token and a certificate in response to a single request from a client. In an implementation, certificates provided by the authentication service may be short-lived certificates (SLCs). Short-lived certificates have a short validity period, and accordingly may be managed and revoked without using certificate revocation lists.

A client may execute an application module which forms a bundled request (e.g., a single request for a token and a certificate) when the client seeks access to services from a services provider or when the client seeks to establish secure communications. Two users, for example, may each seek access to an instant messaging service provided by a service provider through a respective bundled request to an authentication service. The authentication service authenticates the requests using credentials of the users. The authentication service, in response to the bundled request of each user may provide the user with a token and a certificate. The two users are then "signed-in" (i.e., "logged on") and may, for instance, communicate during an instant messaging session through the use of instant messages. Each user may also present their respective token to access resources at a plurality of service providers without requiring additional presentation of credentials to the service providers, or to the authentication service. Thus, a single sign-in may provide the user with access to a variety of resources from a plurality of service providers.

During the instant messaging session, the users may desire to share data with each other. A user interface for example may be utilized to select and share photos, files, applications and so forth. The respective certificates of each user may be used with standard techniques to establish secure transactions between the users. For example, security support protocols such as Secure Channel (Schannel) which implements Transport Layer Security (TLS) and Secure Socket Layer (SSL) may utilize the respective certificates of the users to establish a mutually authenticated secure session. Thus, the certificate provided in response to the bundled request may permit users to engage in secure peer-to-peer transactions and data sharing.

In the following discussion, an exemplary environment is first described which is operable to employ techniques to provide instant messaging and search. Exemplary procedures and user interfaces are then described which may be provided by the exemplary environment, as well as in other environments.

Exemplary Environment

Figure 1:
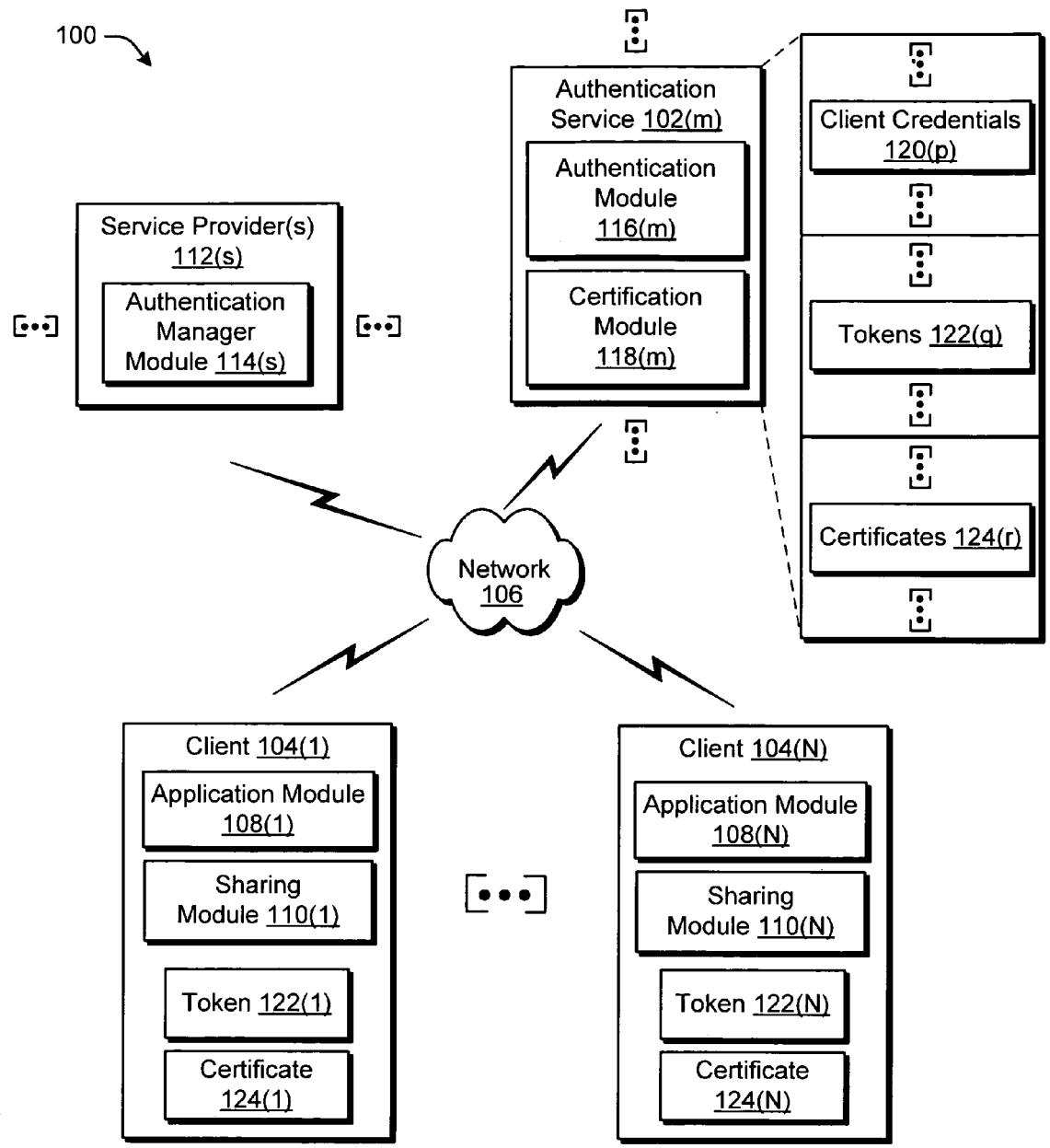
FIG. 1 is an illustration of an environment in an exemplary implementation which is operable to implement an authentication service to provide tokens and certificates in response to a single request from a client.

FIG. 1 is an illustration of an environment 100 in an exemplary implementation which is operable to implement an integrated authentication service to receive and respond to bundled requests. The environment 100 includes a plurality of authentication services 102(m) (where "m" can be any integer from one to "M") which are accessible by a plurality of clients 104(1), . . . , 104(N) over a network. The clients 104(1)-104(N) may be configured in a variety of ways for accessing the network 106. For example, one or more of the clients 104(1)-104(N) may be configured as a computing device, such as a desktop computer, a mobile station, an entertainment appliance, a set-top box communicatively coupled to a display device, a wireless phone, a game console, and so forth. Thus, the clients 104(1)-104(N) may range from full resource devices with substantial memory and processor resources (e.g., personal computers, game consoles) to low-resource devices with limited memory and/or processing resources (e.g., traditional set-top boxes, hand-held game consoles). The clients 104(1)-104(N) may also relate to a person and/or entity that operate the clients. In other words, one or more of the clients 104(1)-104(N) may describe logical clients that include users, software, and/or devices.

Additionally, although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks. For instance, client 104(1) may be communicatively coupled via a peer-to-peer network with client 104(N). Each of the clients 104(1), 104(N) may also be communicatively coupled to the authentication service 102(m) over the Internet. A variety of other instances are also contemplated.

Each of the plurality of clients 104(1)-104(N) is illustrated as including a respective one of a plurality of application modules 108(1)-108(N). Application modules 108(1)-108(N) are executable to provide a variety of functionality to respective clients 104(1)-104(N). For example, one or more application modules 108 may be configured to send and receive email. Email employs standards and conventions for addressing and routing such that the email may be delivered across the network 106 utilizing a plurality of devices, such as routers, other computing devices (e.g., email servers), and so on. In another example, an application module 108 may be configured to provide one or more business productivity functions such as word processing, database, spreadsheet, and presentation functionality. In a further example, application module 108 may be configured to provide one or more software development functions such as development interfaces, tools, management, and compilation. Further, an application module 108 may provide other computing functions such as graphic design, web browsing, and media management, editing, viewing, and/or playback.

In yet another example, an application module 108 may be configured to send and receive instant messages. Instant messaging provides a mechanism such that a plurality of clients 104(1)-104(N), when participating in an instant messaging session, may send text messages to each other. A plurality of clients 104(1)-104(N) may be configured to communicate one to another via network 106. The instant messages are typically communicated in real time, although delayed delivery may also be utilized, such as by logging the text messages when one of the clients 104(1)-104(N) is unavailable, e.g., offline. Thus, instant messaging may be though of as a combination of e-mail and Internet chat in that instant messaging supports message exchange and is designed for two-way live chats. Therefore, instant messaging may be utilized for synchronous communication. For instance, like a voice telephone call, an instant messaging session may be performed in real-time such that each user may respond to each other user as the instant messages are received.

Each of the plurality of clients 104(1)-104(N) is also illustrated as including a respective one of a plurality of sharing modules 110(1)-110(N). Sharing modules 110(1)-110(N) are representative of functionality which may be utilized to securely share data between clients 104(1)-104(N). In an implementation, clients 104(1), 104(N) are communicatively coupled directly, one to another (e.g., via a peer-to-peer network). Sharing modules 110(1)-110(N) may be utilized to establish a secure communications channel (e.g., using a security support protocol such as Secure Channel (Schannel)) between clients 104(1), 104(N). Sharing module may implemented in a variety of ways, such as a stand-alone module, integrated within an application module 108, and so on. Thus, although the sharing modules 110(1)-110(N) are illustrated apart from application modules 108 (1)-108(N), the sharing module 110 may be incorporated within the application module 108. Further, sharing module may be provided within a second application module 108 on the same client 104. Further discussion of use of the sharing module for secure peer-to-peer transactions may be found in relation to FIG. 2.

Application modules 108(1)-108(N) may further be configured to access a wide variety of resources from a plurality of service providers 112(s), where "S" can be any integer from one to "S", via network 106. Service providers 112(s) may be configured in a variety of ways. Service providers 112(s) generally provide resources (e.g., services and content) to users 104(1)-104(N) via network 106. The resources may be configured as a variety of content, such as web pages, music, video, images, user forums, templates, add-ins, web logs (blogs), and so forth. Further, service providers 112(s) may provide resources which are services, such as instant messaging service, email service, financial service and so forth. Some resources may be protected such that clients 104(1)-104(N) executing application modules 108(1)-108(N) may need to be authenticated before access is permitted to the resources. Service providers 112(s), for instance may include authentication manager module 114(s) which requires proof of identity before permitting access to resources.

Thus, when a client 104(1)-104(N) seeks resources from a service provider 112(s), the service provider 112(s) may require authentication (e.g., proof of identity). Rather than authenticate directly with the service provider 112(s), the service provider 112(s) may utilize an authentication service 102(m) for authentication, thereby "offloading" authentication to the authentication service 102(m). In this way, the service provider 112(s) may be configured to understand whether the clients 104(1)-104(N) were successfully authenticated by the authentication service 102(m), but does not need to "understand" how the authentication was performed. Authentication via a service may be limited to a particular service provider 112(s), such that authentication would be valid only for the particular service provider 112(s). Alternatively, a single authentication with an authentication service may permit access to resources of a plurality of service providers 112(s). In other words, a single sign-in (i.e., verification of credentials) to the authentication service, authenticates a client (i.e., provides proof of identity of the client) for a plurality of service providers 112(s).

For example, an application module 108 (1) configured as a word processor may provide functionality to access protected document templates through the service provider 112(s) via the network 106. Service provider 112(s) may demand proof of identity when a client 104(1) using application module 108(1) seeks the protected templates. In response, application module 108(1) may provide proof of identity (e.g., a token) of client 104(1) obtained beforehand from authentication service 102(m). If client 104(1) does not currently have valid proof of identity, application module 108(1) may be configured to seek authentication of client 104(1) via the authentication service 102(m) to access the desired document templates. A variety of other examples involving application modules 108(1) configured to provide a variety of functionality are also contemplated.

Authentication service 102(m) is depicted as having an authentication module 116(m) and a certification module 118(m). Authentication service 102(m) is also illustrated as having client credentials 120(p) which may correspond to clients, such as clients 104(1)-104(N). Client credentials 120(p) may be used to verify that clients 104(1)-104(N) "are who they say they are" or in other words to prove the identity of a client. Upon verification of credentials 120(p), authentication service 102(m) is configured to generate a token 122(q) and a certificate 124(r), where "q" and "r" can be any integer from one to "Q" and "R", respectively.

Authentication module 116(m) is representative of functionality which may be utilized to authenticate a client 104(1)-104(n), which may include verification of client credentials 120(p). Authentication module 116(m) may also include functionality to generate a token 122(q). Certification module 118(m) is representative of functionality that may be utilized to issue certificates 124(r). Naturally, in other implementations the modules may be further separated into stand-alone modules, combined, and so forth without departing from the spirit and scope thereof.

In an implementation, authentication service 102(m) may receive a bundled request from a client 104(1) seeking authentication (e.g., a token 122(q)) and a certificate 124(r). Authentication service 102(m) verifies client credentials 120(p) of a client 104(1). The client credentials 120(p), for example, may be a user name and password supplied by the client 104(1). Other client credentials 120(p) are also contemplated such as a shared secret, an encryption key and so forth. Upon verification of client credentials 120(p), authentication module 116(m) may generate a token 122(q) to communicate to client 104(1), which may be used by the client 104(1) for proof of identity at one or more service providers 112(s). Certification module 118(m), in response to the same request, generates a certificate 124(r) to communicate to client 104(1) that is used in conjunction with secure sharing (e.g., via sharing module 110).

Thus, in response to a single-bundled request from the client 104(1), authentication service 102(m) provides client 104(1) with both a token 122(q) and a certificate 124(r). In FIG. 1, for instance, clients 104(1)-104(N) are depicted having received respective tokens 122(1)-122(N) and certificates 124(1)-124(N) from an authentication service 102(m). Thus, authentication service 102(m) integrates functionality for authentication, token issuance and certificate issuance in response to a single request from a client 104(1)-104(n). Naturally, functionality for authentication, token issuance, certificate issuance, and so forth may be divided differently among various modules of authentication service 102(m) in different implementations without departing from the spirit and scope thereof. Further discussion of the functionality and operation of authentication service 102(m) in relation to clients 104(1)-104(N) as well as discussion of certificates 124(r) and tokens 122(q) may be found in relation to FIG. 2.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further description of which may be found in relation to FIG. 2. The features of the integrated authentication techniques described below are platform-independent, meaning that the techniques may be implemented on a variety of commercial computing platforms having a variety of processors.

Figure 2:
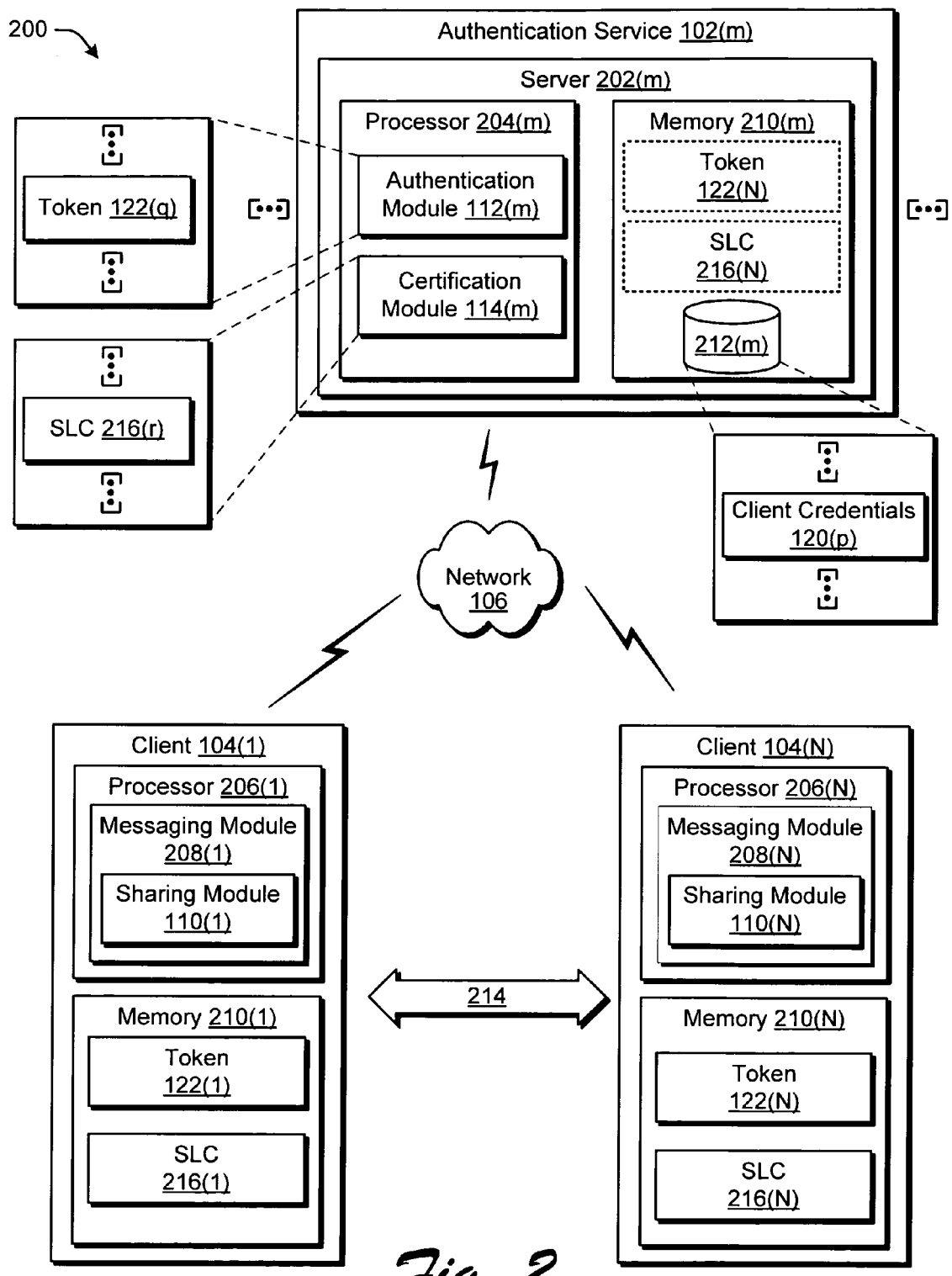
FIG. 2 is an illustration of a system in an exemplary implementation showing an authentication service and a plurality of clients of FIG. 1 in greater detail.

FIG. 2 is an illustration of a system 200 in an exemplary implementation showing the plurality of authentication services 102(m) and the plurality of clients 104(1)-104(N) of FIG. 1 in greater detail. The plurality of authentication services 102(m) are illustrated as being implemented by a plurality of servers 202(m). Although a single server 202(m) is illustrated for each authentication service 102(m), the authentication service 102(m) may be implemented by one or more servers, e.g., a server farm. The plurality of clients 104(1)-104(N) in FIG. 2 are illustrated as client devices. Accordingly, the plurality of servers and the clients 104(1)-104(N) are each illustrated as including a respective processor 204(m), 206(1)-206(N) and respective memory 210(m), 210(1)-210(N).

Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 210(m), 210(1)-210(N) is shown for the respective servers 202(m) and clients 104(1)-104(N), a wide variety of types and combinations of memory may be employed, such as random access memory (RAM), hard disk memory, removable medium memory, and other types of computer-readable media.

As previously described, the application modules 108(1)-108(N) of FIG. 1 may be configured to provide instant messaging functionality. FIG. 2 depicts the application modules 108(1)-108(N) of FIG. 1 implemented as messaging modules 208(1)-208(N) to provide instant messaging functionality. Each of the plurality of clients 104(1)-104(N) includes a respective one of a plurality of messaging modules 208(1)-208(N) which is illustrated as being executed on a respective processor 206(1)-206(N) and is storable in a respective memory 210(1)-210(N). The messaging modules 208(1)-208(N) are executable to provide an instant messaging session, either in indirect communication over the network 106 and/or in direct communication over a peer-to-peer network 214, which is illustrated in FIG. 2 by a double-headed arrow to indicate that the peer-to-peer network 214 may be provided separately from the network 106.

Further, FIG. 2 depicts that each of the messaging modules 208(1)-208(N) includes a respective sharing module 110(1)-110(N). Sharing module 110 is representative of functionality within a messaging module 208 that may be utilized to provide secure communications between clients (e.g, clients 104(1) and 104(N)) via a network (e.g., network 106 and/or peer-to-peer network 214). For instance, sharing module 110 may be executed to create secure transactions between clients using Secure Channel protocols (Schannel). Schannel implements Transport Layer Security (TLS) and Secure Sockets Layer (SSL) collectively, which is referred to as "TLS/SSL". TLS/SSL authenticates and secures data transactions using certificates and encryption. TLS/SSL, for instance, may utilize symmetric and/or asymmetric key encryption based upon public keys provided in certificates. Using these or other protocols, a secure communications channel (e.g., a TLS/SSL session) is established between clients using the certificates. A variety of secure transactions may occur between clients over a secure channel such as communications, and/or sharing of photos, files, applications and so forth.

A certificate is a digital form of identification that is traditionally issued by a certificate authority (CA) and may contain identification information, a validity period, a public key, a serial number and the digital signature of the issuer. The certificate binds the identity of the entity to whom the certificate was issued to the public key. Security support protocols such as Schannel may then be used to create secure sessions between clients and server or between clients. Typically, the certificate will be validated by the CA when a secure session is initiated. The CA maintains a certificate revocation list (CRL). The certificate may be checked against the CRL via network 106 to determine if the certificate is still valid. The Authentication service 102(m) may be configured to act as a CA for certificate issuance and management. In particular, the certification module 114(m) represents functionality within the authentication service 102(m) that may be utilized for certificate issuance and management, i.e., provides the functionality of a CA.

Certificates 124(r) described in relation to FIG. 1 may be configured in a variety of ways, such as traditional certificates, third party certificates, signed or unsigned, International Telecommunication Union (ITU) Recommendation x.509, short-lived certificates and so forth. In the implementation of FIG. 2, certificates issued by the authentication service 102(m) are depicted as short-lived certificates (SLCs) 216(r). A SLC 216(r) has a validity period that is relatively short. That is, the validity period may be a number of hours such as 4 hours, 8 hours, or 24 hours rather than a number of days, weeks, or months. Due to the relatively short validity period, the CA (e.g., the authentication service 102(m)) may manage the SLCs 216(r) without maintaining a certificate revocation list (CLR). Rather, the SLCs 216(r) are allowed to expire once the validity period has run. Thus, a revocation list is not maintained or referenced to determine the validity of a SLC 216(r) in this example. Therefore, when a secure session is initiated between clients, the client does not contact the CA to validate the certificates involved. Rather, the clients determine if the validity period of the certificate has expired. Thus, using SLCs 216 (r) reduces the amount of network traffic that is used to establish a secure session. Naturally, authentication service 102(m) could be configured to issue both SLCs and other certificates. Clients 104(1)-104(N) are each depicted as having a respective SLC 216(1)-216(N). Thus, an Schannel as previously described may be employed to permit secure transactions between two or more of clients 104(1)-104(N) using respective SLCs 216(1)-216(N).

Messaging modules 208(1)-208(n) are executable to form a request for communication to authentication service 102 (m), such as to seek a token 122 and an SLC 216. Therefore, the request may be a bundled request in that a single request may be communicated for both the token 122 and an SLC 216. For instance, client 104(1) may send a bundled request to sever 202(m). In an implementation, the request is based upon Web Service Trust (WS-Trust) protocol. WS-Trust provides protocols for requesting, issuing and brokering security tokens. In particular, operations to acquire, issue, renew and validate tokens are defined by WS-Trust. Traditionally, however, WS-Trust was limited to single requests for tokens, and therefore WS-Trust defined requests for tokens but did not define operations to request certificates. In an implementation, the WS-Trust protocol is extended with syntax to support sending Public Key Cryptography Standard number 10 (PKCS#10) in a request and returning International Telecommunication Union (ITU) Recommendation X.509 certificates in a response. In this manner, a request based upon WS-Trust may be bundled such that a single request may be utilized to obtain both a token and a certificate, thereby conserving network, client and server resources.

The following provides an exemplary sample of a portion of a bundled request illustrating extensions to WS-Trust that may be used to request a certificate:

```
<wst:RequestSecurityToken xmlns="http://schemas.xmlsoap.org/ws/2002/04/secext">
    <wst:RequestType>...</wst:RequestType>
    <wsp:AppliesTo xmlns:wsa="http://schemas.xmlsoap.org/ws/2004/03/addressing">
        <wsa:EndpointReference>
            <wsa:ServiceName>... </wsa:ServiceName>
        </wsa:EndpointReference>
    </wsp:AppliesTo>
    <wst:Supporting>
        <wsse:BinarySecurityToken
            ValueType="http://schemas.microsoft.com/Passport/SoapServices/PPCRL#PKCS10"
            EncodingType="wsse:Base64Binary">....</wsse:BinarySecurityToken>
    </wst:Supporting>
    <wsse:PolicyReference URI=... />
</wst:RequestSecurityToken>
```

In the above request, </wsa:ServiceName> identifies the application requesting the certificate. The element </wst:Supporting> describes the supporting token for the request. In the request, the supporting token is typically a PKCS#10 blob (binary large object). The element </wsse:BinarySecurityToken/@ValueType> specifies a value used to identify PKCS#10. The element </wsse:PolicyReference/(URI> specifies the policy to be used by certification module 114(m) for generating and issuing the certificate.

In order to issue a certificate, the certification module 114(m), when executed, may rely upon a policy to determine characteristics of the certificate to be issued. Policies may be configured in a variety of ways, such as to determine what type of certificate is to be generated and issued by authentication service 102(m). For example, certification module 114(m) may examine one or more policies, which define that a short-lived certificate 216(r) should be issued in response to a request received by authentication service 102(m). The same policy or another policy may similarly define additional certificate characteristics, such as expiration times, validity period, key type, encryption types, certificate type and so forth. Thus, a policy or set of policies may establish the rules that govern characteristics of certificates issued in response to a bundled request. Authentication service 102(m) applies these rules to generate a certificate appropriate for the request received. In an implementation, a user may select from a variety of different policies options provided by default or by a system administrator. Characteristics of short-lived certificate 216(r) issued depend on the policy option selected by the user.

The authentication service 102(m) may retrieve the specified policies from a variety of locations. For example, policies may be maintained within certification module 114(m), messaging module 208(m) (or application module 108(m) of FIG. 1), server 202(m), and so forth. Policies might also be accessible from a remote location via network 104, a peer-to peer network 214, or otherwise remotely accessible. For example a policy may be retrievable from another sever 202(m) or authentication service 102(m), from one of clients 104(1)-104(N), or from a service provider 112(s).

In an implementation, the authentication service 102(m) sets default policies which may be modified by a user of application module 108 or messaging module 208, a service provider 112(s), a system administrator and so forth. Authentication service 102(m), for example, may allow modification of a variety of certificate policies by a user, e.g., overriding default policies to create new policies. In another instance, a messaging module 208 may expose a user interface which allows a user to create a new policy "from scratch". Naturally, certain access rights may be required for a user, administrator and so forth to modify or create policies.

Authentication service 102(m), through execution of the authentication module 112(m), may receive a bundled request based upon WS-Trust extended as described above from over the network 106. For example, server 202(m) receives the request seeking authentication token 122(q) and certificate 216(r). Server 202(m) is depicted as executing authentication module 112(m) and certification module 114(m) on processor 204(m). Modules may also be stored in memory 210(m).

In an implementation, the authentication module 112(m), when executed on processor 204(m) of server 202(m), authenticates a bundled request that is sent by a client 104(1). Once the bundled request from client 104(1) is authenticated, authentication module 112(m) is further executed to generate a token 122(1) corresponding to client 104(1) for communication to client 104(1). Additionally, certification module 114(m) also generates a short-lived certificate 216(1). Notably, the short-lived certificate 216(1) is generated based upon authentication of the same bundled request from client 104(1). Naturally, an authentication service 102(m) may operate to generate tokens 122(q) and certificates, including short lived certificates 216(r), for numerous clients 104(1)-104(N).

Authentication of a bundled request may include accessing and verifying client credentials 120(p). As depicted in FIG. 2, a plurality of client credentials 120(p) corresponding to a plurality of clients 104(1)-104(N) are maintained in storage 212(m) of memory 210(m) provided with server 202(m). It is noted that while client credentials are shown on server 202(m), credentials could be maintained on another server 202 of authentication service 102(m) or otherwise located remotely in storage. The credentials 120(p) located remotely may be accessible via network 106.

In general, credentials are verified by comparing credential information (e.g., name and password) provided by the client with client credentials 120(p) accessible to authentication service 102(m) (e.g. stored in memory 210(m)). Client credentials 120(p) may be verified using numerous authentication schemes, such as by challenge/response, digest, negotiate, NT LAN Manager (NTLM), kerberos, basic (clear text) and so forth. This may include transferring credentials (e.g., clear text) between client 104(1) and server 202(m) via network. Alternatively a scheme in which user credentials are not sent over network 106 (e.g. challenge/response) may be used for enhanced security.

Authentication service 102(m) is further configured to generate a response to a bundled request. For instance, once a bundled request from client 104(1) has been authenticated, and a corresponding the token 122(1) and SLC 216(1) have been generated, one or more of modules of authentication service 102(m) respond to the bundled request by communicating the corresponding token 122(1) and the SLC 216(1) to client 104(1). Authentication service 102(m) may be configured to use a single response to communicate both tokens 122(q) and the SLCs 216(r) to a respective one of clients 104(1)-104(N). Alternatively, tokens 122(q) and SLCs 216(r) may be returned to a respective client separately.

As with the previously described bundled requests, the responses to bundled requests may be based upon WS-Trust protocol. Again, traditionally, WS-Trust was limited to single requests for tokens. Therefore WS-Trust had defined requests for tokens but did not define operations to request certificates or to respond with certificates. In an implementation, the WS-Trust protocol is extended with syntax to support returning X.509 certificates in response to a bundled request. The returned certificates may be configured according to a policy as previously described.

The following provides an exemplary sample of a portion of a response to a bundled request illustrating extensions to WS-Trust to respond with a certificate:

```
<wst:RequestSecurityTokenResponse>
    <wst:TokenType>wsse:X509v3</wst:TokenType>
    <wsp:AppliesTo xmlns:wsa="http://schemas.xmlsoap.org/ws/2004/03/addressing">
        <wsa:EndpointReference>
            <wsa:ServiceName>...</wsa:ServiceName>
        </wsa:EndpointReference>
    </wsp:AppliesTo>
```

-continued

```
<wst:LifeTime>
    <wsu:Created>...</wsu:Created>
    <wsu:Expires>...</wsu:Expires>
</wst:LifeTime>
<wst:RequestedSecurityToken>
    <wsse:BinarySecurityToken EncodingType="wsse:Base64Binary"
Id="...">...</wsse:BinarySecurityToken>
</wst:RequestedSecurityToken>
<wst:RequestedTokenReference>
    <wsse:KeyIdentifier ValueType="http://schemas.xmlsoap.org/ws/2003/06/secext#X509v3"/>
    <wsse:Reference URI="..."/>
</wst:RequestedTokenReference>
</wst:RequestSecurityTokenResponse>
```

In the sample response above, </wst:TokenType> has a value of "wsse:X509v3" is to identify that an X.509 v3 certificate is being returned. The element </wst:RequestedSecurityToken> contains the base 64 encoded binary blob of the issued certificate.

In a further example, client 104(N) requests authentication from authentication service 102(m) using a bundled request. Authentication service 102(m) receives the bundled request and operates to authenticate client 104(N) and to generate a corresponding token 122(N) and SLC 216(N). Token 122(N) and SLC 216(N) are generated by modules executed on a processor of authentication service 102(m), such as authentication module 112(m) and/or certification module 114(m) executed on processor 204(m) of server 202(m).

Authentication service 102(m) then forms a response to communicate the token 122(N) and certificate 216(N) to client 104(N). The response is generated by one or more modules of authentication service 102(m). Communication may occur immediately or token 122(N) and certificate 216(N) may be stored in memory for communication at a latter time (e.g, after further operations). Token 122(N) and certificate 216(N) are illustrated in phantom as storable in memory 210(m) of server prior to communication to client 104(1). Authentication service 102(m) responds to the request by communicating the token 122(N) and certificate 216(N) to client 104(N). FIG. 2 depicts client 104(N) as having received token 122(N) and certificate 216(N), and storing in memory 210(N).

Thus, as depicted in FIG. 2, clients 104(1)-104(N) may receive respective tokens 122(1)-122(N) and respective SLCs 216(1)-216(N) from authentication service 102(m) in response to a respective bundled request of each client. Each client may then use the respective token 122 for proof of identity to access resources at a plurality of service providers 112(s) depicted in FIG. 1. Further, clients 104(1)-104(N) may establish secure communications, one to another via Schannel using respective SLCs 216(1)-216(N). Any one client (e.g., 104(1)) may sign-in (authenticate) once to the authentication service 102(m) to access resources from service providers 112(s) and to engage in secure communications with other clients, further discussion of which may be found in relation to the following procedures.

Exemplary Procedures

The following discussion describes procedures that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and/or the system 200 of FIG. 2.

Figure 3:
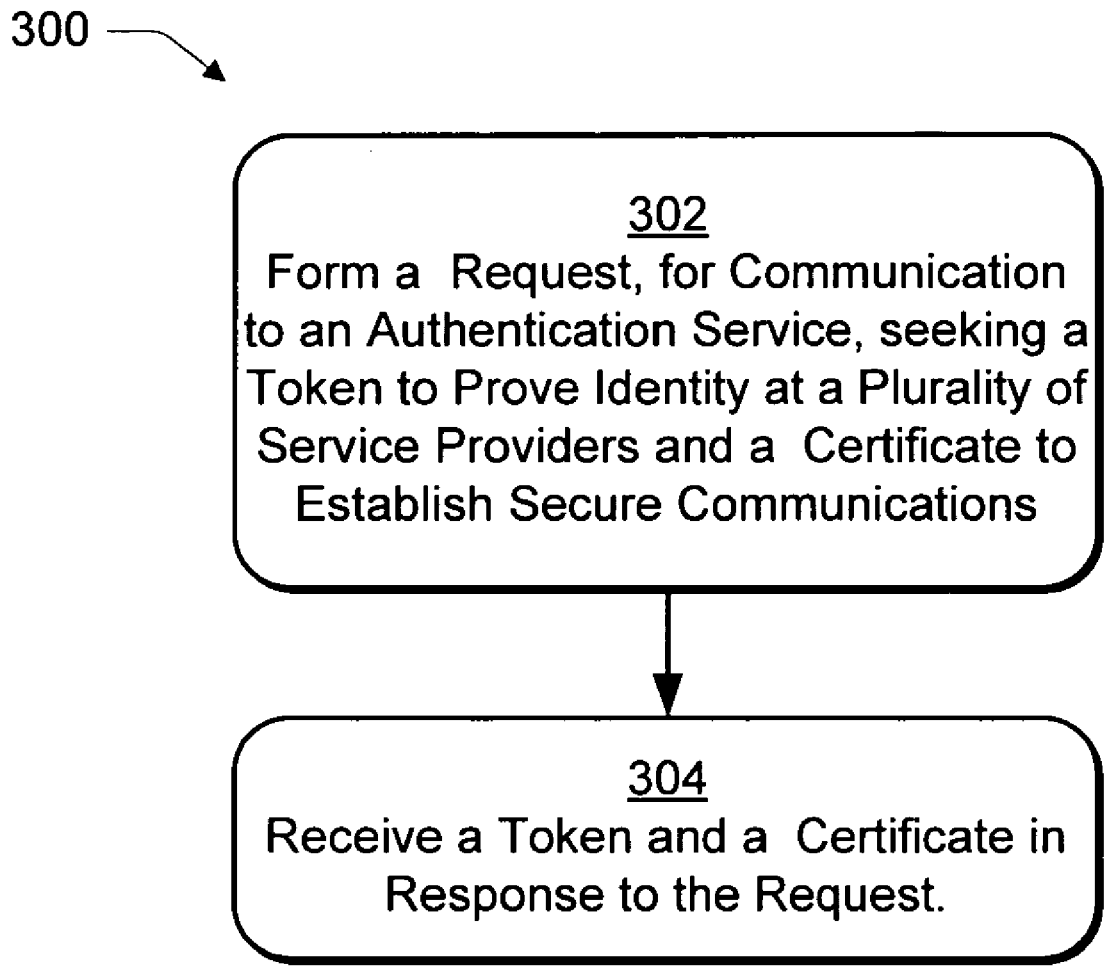
FIG. 3 is a flow diagram depicting a procedure in an exemplary implementation in which a client requests a token and short-lived certificate from an authentication service.

FIG. 3 is a flow diagram depicting a procedure 300 in an exemplary implementation in which a client seeks a token and certificate from an authentication service. A request is formed, for communication to an authentication service, seeking both a token to prove identity at a plurality of service providers, and a certificate to establish secure communications. (block 302).

For example, client 104(1) may be executing an application module 108(1) of FIG. 1 that is seeking resources (e.g. web pages) from a service provider 112(s). Application module 108(1) forms a request for communication to authentication service 102(m) to authenticate client 104(N) such that client 104(N) may access the resources (e.g., web pages). The request seeks both a token 122(q) used to prove identity of client 104(1) to service provider 112(s) and a certificate 124(r) which client 104(1) may use later to establish secure communications with another client 104(N).

In another example, client 104(1) may execute a messaging module 208(1) of FIG. 2 to communicate via an instant messaging session with a messaging module 208(N) on client 104(N). In this instance, the instance messaging session will occur indirectly via a service provider 112(s) configured to provide instant message and requiring authentication. Further clients 104(1) and 104(N) wish to exchange photos securely. Upon execution, messaging module 208(1) may be configured to authenticate or "sign-in" client 104(1). To accomplish this, messaging module 208(1) forms a request for communication to authentication service 102(m). The request seeks a token 122(q) used to prove identity of client 104(1) to service provider 112(s) and a short-lived certificate (SLC) 216(r) which client 104(1) may use to establish secure communications with another client 104(N).

A token and certificate are received in response to the request. (block 304). Following the second example above, client 104(1) and in particular messaging module 208(1) receives in response to the request a token 122(1) and a SLC 216(1). The messaging module 208(1) may then present the token 122(1) to a service provider 112(s) to access desired instant messaging service. Thus, clients 104(1), 104(N) may engage in instant messaging. As described, the token 122(1) may also be used as proof of identity at other service providers of the plurality of providers 112(s) to access other resources, such as web pages, music, photos and so forth. Further, sharing module 110(1) within messaging module 208(1) may be executed to establish secure communications between clients 104(1) and 104(N), using the received SLC 216(1).

Figure 4:
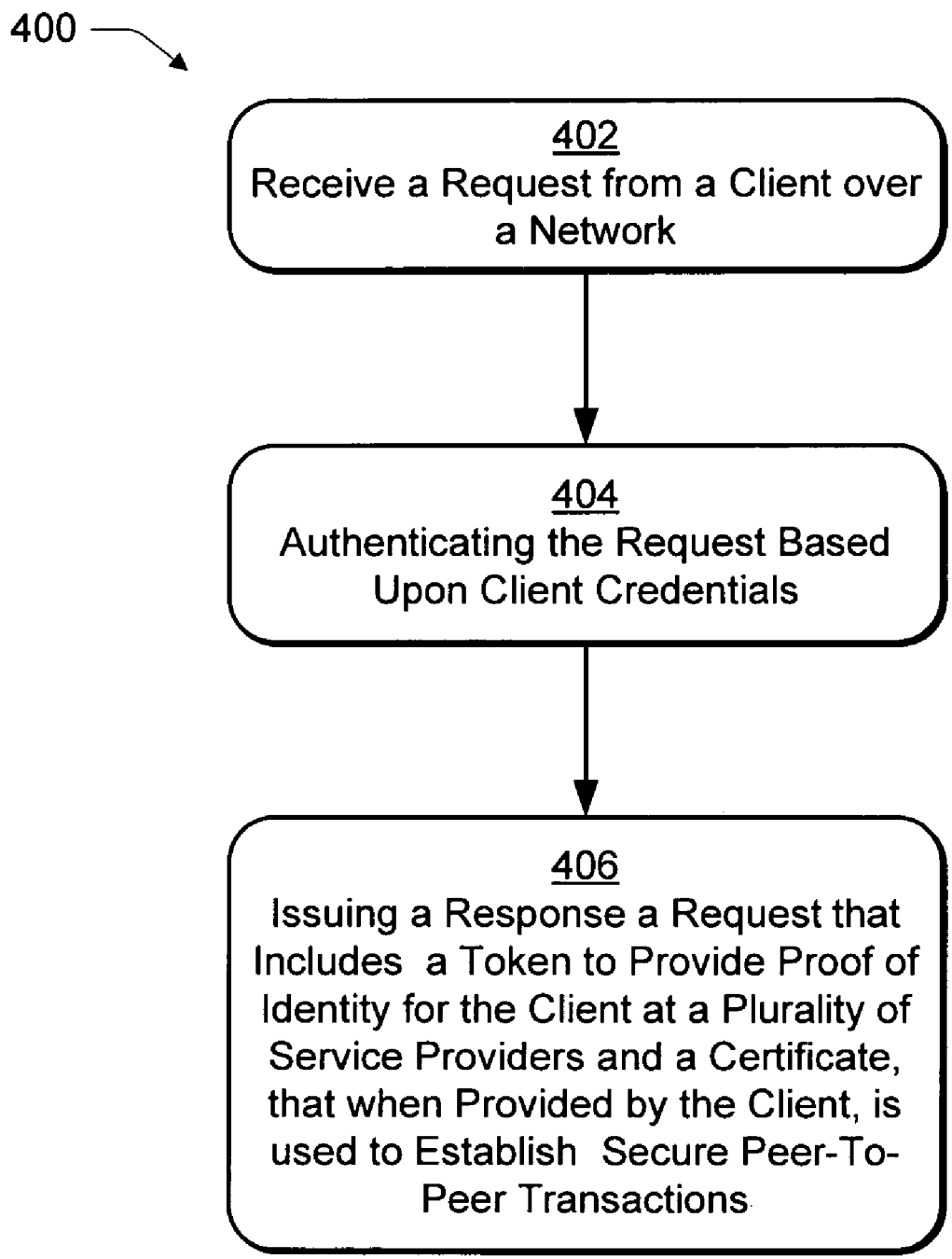
FIG. 4 is a flow diagram depicting a procedure in an exemplary implementation in which an authentication service responds to a request for a token and a certificate from a client.

FIG. 4 is a flow diagram depicting a procedure 400 in an exemplary implementation in which an authentication service responds to a request for a token and a certificate from a client. A request from a client is received over a network (block 402). For example, authentication service 102(m) depicted in FIG. 2 may receive a bundled request from client 104(N) over network 106. The request may be based upon WS-Trust extended to allow bundled requests as previously described.

The request is then authenticated using client credentials (block 404). For example, authentication service 102(m) may access credentials 120(p) stored in memory 210(m) of server 202(m). Credentials 120(p) may be verified, for instance, against a username and password provided in the received request. In another instance, authentication service 102(m) initiates a challenge/response authentication scheme which does not require client 104(N) to send credentials (e.g., user name and password) over the network 106 and may accordingly increase security.

A response to the request is issued which includes a token to provide proof of identity of the client at a plurality of service providers and a certificate that is used to establish secure peer-to-peer transactions (block 406). Upon authentication of client 104(1) in the previous example, authentication service 102(m) issues a response to client 104(1) that includes a token 122(N) and a short-lived certificate 216(N). The response may be configured in a variety of ways, such as based upon WS-Trust extended to allow responses to bundle requests as previously described. The response may be communicated to the client 104(N) via network 106. Client 104(N) receives the response and may thereafter use the token 122(N) for proof of identity to access resources a plurality of service providers 112(s) and the SLC 216(N) to establish secure communications with another client. For instance, client 104(N) may share data, photos, files and so forth via sharing module 110(N).

Figure 5:
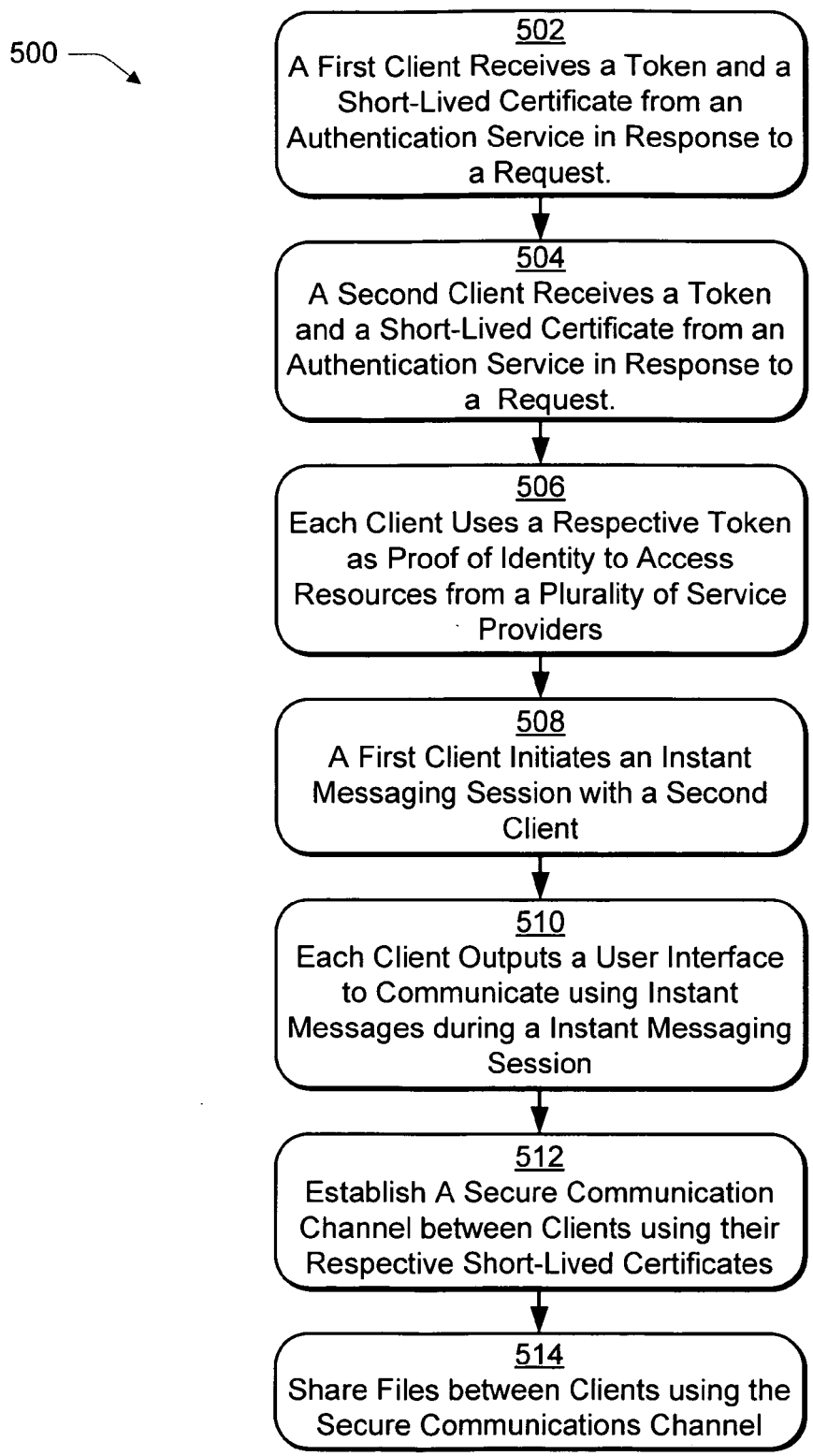
FIG. 5 is a flow diagram depicting a procedure in an exemplary implementation in which secure peer-to-peer communications are established using short-lived certificates during an instant messaging session.

FIG. 5 is a flow diagram depicting a procedure 500 in an exemplary implementation in which a client interacts with an instant messaging user interface to securely share files with another client during an instant messaging session. During the discussion of FIG. 5, reference will also be made to the illustrations of FIGS. 6-7.

A first client receives a respective token and a short lived certificate from an authentication service in response to a bundled request (block 502). A second client also receives a respective token and short lived certificate from an authentication service in response to a single request (block 504). Clients 104(1) and 104(N) depicted in FIG. 2, for example, may each form a request using respective messaging modules 208(1) and 208(N), and communicate the request to authentication server 102(m). In response to the respective requests, clients 104(1), 104(N) receive tokens 122(1), 122(N) and SLCs 216(1), 216(N), respectively, from the authentication service 102(m).

Each client may then use a respective token to access resources from a plurality of service providers (block 506). For instance, client 104(1) may use token 122(1) to access instant messaging service from one of the plurality of service provider 112(s). In addition, client 104(1) through messaging module 208(1) may use token 104(1) to access web pages, music, updates and so forth from another of the plurality of service providers 112(s). Client 104(N) may similarly use token 122(N) to access instant messaging service and additional resources such as images, email, news, add-ins, and so forth from the plurality of service providers 112(s).

A first client initiates an instant messaging session with a second client (block 508). Each client then outputs a user interface to communicate using instant messages during the instant messaging session (block 510).

Figure 6:
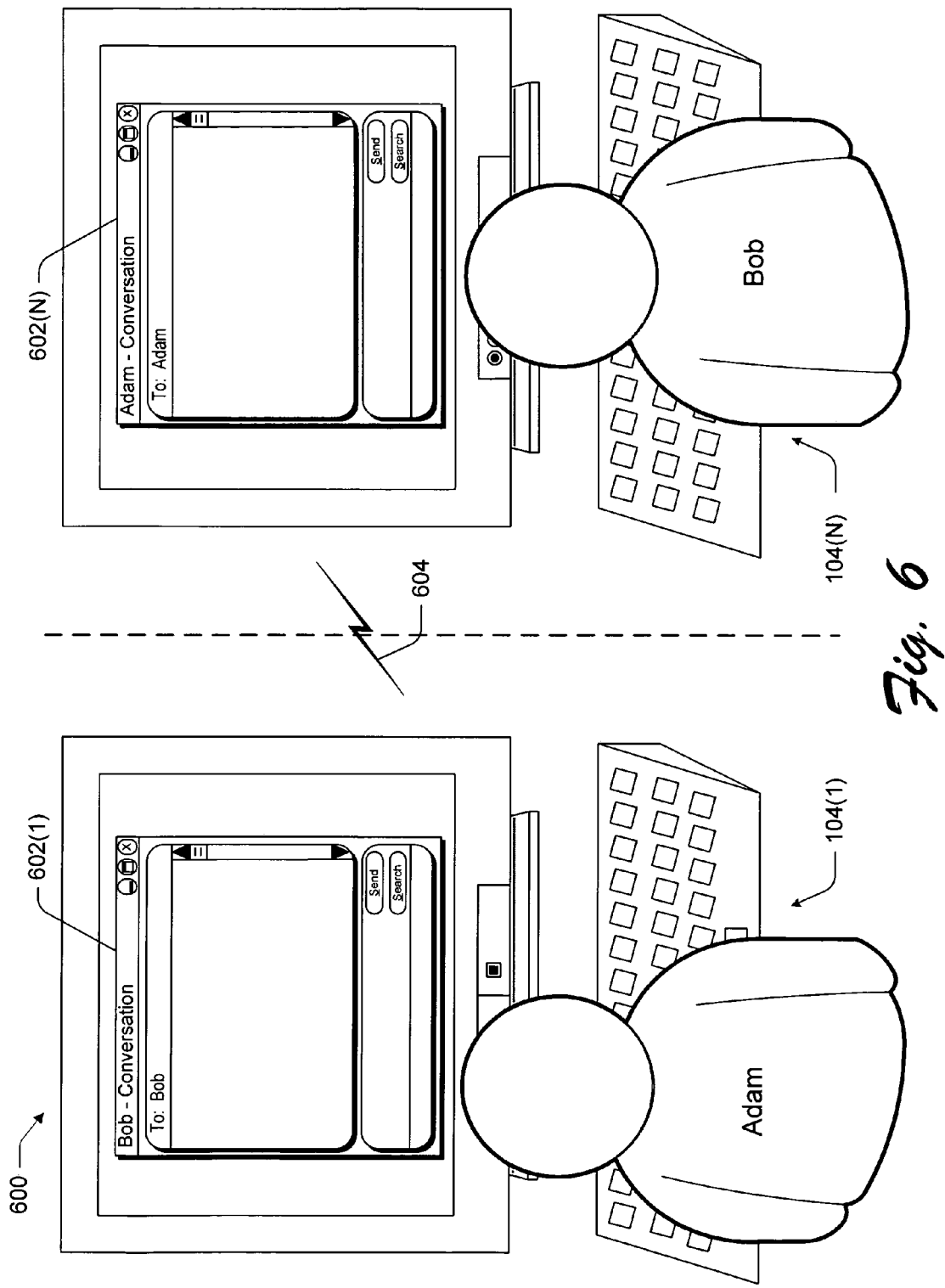
FIG. 6 is an illustration in an exemplary implementation showing user interfaces that are output in relation to an instant messaging session between the plurality of clients of FIG. 2 during an instant messaging session initiated by the procedure of FIG. 5.

FIG. 6, for example, is an illustration 600 in an exemplary implementation showing user interfaces that are output in relation to an instant messaging session between the plurality of clients 104(1)-104(N) of FIG. 2 during an instant messaging session initiated by the procedure 500 of FIG. 5. A first client 104(1) (illustrated as "Adam") and a second client 104(N) (illustrated as "Bob") are engaged in an instant messaging session. Text associated with instant messaging session is rendered for viewing in respective user interfaces 602(1), 602(N) output by the respective clients 104(1), 104(N).

The text messages that are exchanged are transmitted between the clients 104(1), 104(N) via a network connection 604, which may be implemented, for example, over the network 106 of FIG. 1, over the peer-to-peer network connection 214 of FIG. 2, and so on. Although FIG. 6 is illustrated and described in relation to a plurality having two clients 104(1)-104(N) as participating in an instant messaging session, it should be recognized that the techniques described herein may also be applied to scenarios in which three or more users are participating in an instant messaging session.

Referring again to FIG. 5, a secure communications channel is established between clients using their respective short-lived certificates (SLCs) (block 512). For instance, a secure communications channel may be established between clients 104(1) and 104(N). In this instance, respective SLCs 216(1) and 216(N) may be utilized by Schannel to establish a TSL/SSL session. The secure channel (e.g., TSL/SSL session) may be established in a variety of ways. In one implementation, the TSL/SSL session is established automatically along with the instant messaging session. In another instance, the TSL/SSL session is established automatically at the time files are shared between clients. In yet another instance, a client 104(1) chooses between secure sharing or unsecured sharing. In this instance, the TSL/SSL session is established in response to client action, such as selection of a secured sharing item from a menu in a user interface providing a variety of sharing options.

Figure 7:
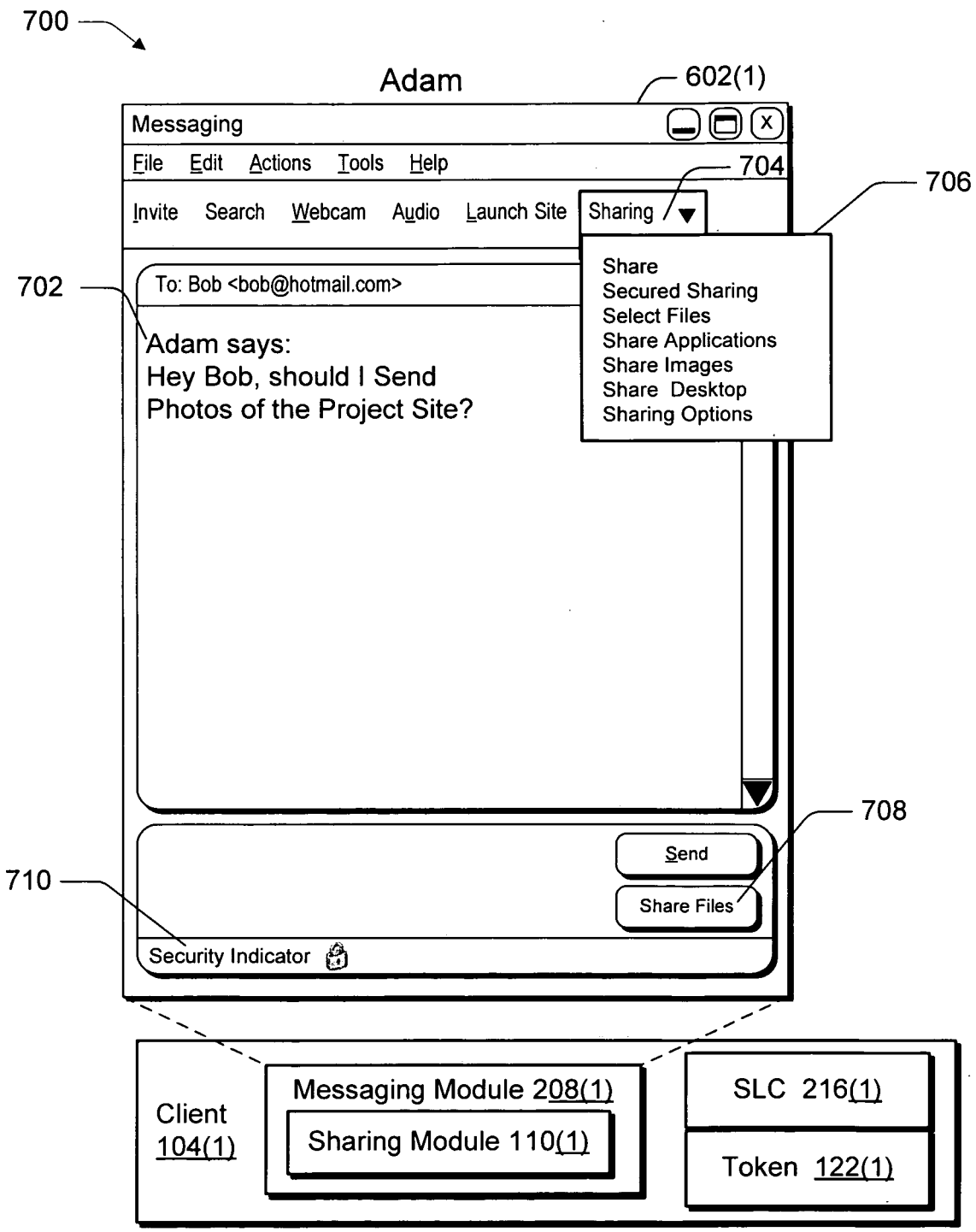
FIG. 7 is an illustration of an exemplary implementation in which a user interface of FIG. 6 is shown providing a pop-up menu of options configured to engage in secure peer-to-peer transactions.

FIG. 7 is an illustration of an exemplary implementation in which the user interface 602(1) of FIG. 6 is shown providing a menu of options for secured sharing of files, images, applications, and so forth. The client 104(1) is illustrated as executing the messaging module 208(1) to provide the user interface 602(1). Naturally, the user interface may be implemented in a variety of ways to provide sharing options to a client. Various controls, pop-up windows, menu items, menu lists, indicators, dialogs, selections and so forth related to data sharing (e.g., sharing of files, photos, music, screenshots, applications and so forth) and options for sharing may be provided to a client, e.g., client 104(1).

In the exemplary implementation depicted in FIG. 7, the first client and second client (i.e., Adam and Bob) have exchanged text messages 702 in an instant messaging session which are displayed in the user interface 602(1). The user interface 602(1) includes a representation 704 of a shared menu item. A menu list 706 of sharing options is illustrated as displayed adjacent to the representation 704, i.e., the sharing menu item. For instance, the menu list 706 may be displayed when "right-clicking" the representation 704 of the sharing menu item, by entering a key combination, and so on. A share files button 708 may also be provided. Clicking the share file button 708 may open menu list 706 or another window having a different menu list of share options.

A variety of sharing options may be provided. As illustrated by menu 706 options such as "Share", "Secured Sharing", "Select Files", "Share Applications", "Share Images", "Share Desktop" are provided. Such options in this instance provide access to functionality that permits secured and unsecured sharing, selection of files either locally or via a network, sharing and sharing option associated respectively with sharing of files, applications, images, a desktop, and so forth. "Other Sharing Options" may provide additional features such as access to functionality to modify settings, set security policies, set transfer speeds, and so forth. Naturally, these features may be implemented within a user interface such as user interface 602(1) in a variety of ways. For instance, sharing options may be provided on a menu bar, a side bar, individual buttons and so forth. Sharing options may also be textually or graphically represented in a variety of positions with user interface 602(1).

A security indicator 708 may be provided to indicate via the user interface 602(1) whether a secure communications channel has been established. The indicator may be configured in a variety of ways. Displayed text may indicate security such as displaying "Secure" or "Unsecure". In another instance, a graphic representation may indicate security, such as a lock depicted as either open or closed. A scale of security such as a relative rating may also be displayed textually or graphically.

Thus, client 104(1) may use the interface 602(1) depicted in FIG. 7 to securely share files. A secure communications channel may have been established prior to client 104(1) accessing menu items, such as automatically when an instant messaging session is initiated. Alternatively, client 104(1) may select a secure sharing option from a user interface, such as menu 706 which initiates establishment of a secure communications channel.

Again referring to FIG. 5, the clients use the secure communications channel to share files (block 514). For example, client 104(1) may select files for sharing using the sharing menu list 706 of FIG. 7. As an example, client 104(1) may use the menu list 706 to select a photo of a proposed project site, e.g. a photo stored in memory 210(1) of FIG. 2 or otherwise accessible to client 104(1) (e.g., downloaded via network 106 or locally from computer-readable media). Client 104(1) may then share the photo with client 104(N), using the secure communication channel previously established using respective certificates 216(1) and 216(N). Similarly, client 104(N) may securely share data, for instance a spreadsheet with project cost estimates, with client 104(1) using the secure channel.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
   forming, by a processor of a client device configured to communicate with other devices via a network, a bundled request, for communication to an authentication service over a network, the bundled request is configured according to an extended web service trust protocol that comprises a web service trust protocol for token requests that is extended with syntax that permits a request for a certificate, such that the extended web service trust protocol supports bundled requests for a token and a certificate, and the bundled request comprises a request for a token to prove identity at any of a plurality of service providers and a request for a certificate to establish secure communications;
   receiving, by the client device, the token and the certificate in response to the bundled request; and
   establishing, by the client device, secure communications for secure data sharing between the client device and a different client device using the received certificate with another certificate of the different client device.

2. The method as recited in claim 1 further comprising providing client credentials for verification by the authentication service, wherein a single verification of the client credentials permits issuance of both the token and the certificate.

3. The method as recited in claim 1 wherein the establishing secure communications includes setting up a secure communications channel between two clients using a respective said certificate of each client.

4. The method as recited in claim 1 wherein the certificate is a short-lived certificate (SLC).

5. The method as recited in claim 4 wherein:
   the SLC includes an expiration time that defines a validity period; and
   the SLC is automatically revoked when the expiration time passes.

6. A method implemented at a computing device, the method comprising:
   receiving, by an authentication service executed at the computing device having a processor and memory and configured to issue tokens and certificates, a single request from a client over a network;
   issuing, by the authentication service executed at the computing device, a response to the single request utilizing an extended web service trust protocol, the extended web service trust protocol comprises a web service trust protocol for certificate requests that is extended with syntax which permits inclusion of the certificate in the response to the single request, and the single request includes:
   a token configured to be provided as proof of the client's identity to at least one service provider; and
   a certificate that is separate and distinct from the token, and when the certificate is received by the client, the certificate is used with another certificate received from a different client to establish secure peer-to-peer transactions between the client and the different client.

7. The method as recited in claim 6 wherein the certificate is based upon a configurable policy which defines one or more of a certificate validity period, certificate type, key type, key length, key usage, extended key usage, policy id, user notice, clock skew, or certificate signing period.

8. The method as recited in claim 6 wherein the certificate includes a public key used to establish a secure communications channel between the client and the different client, and wherein the secure communications channel permits the secure peer-to-peer transactions between the client and the different client.

9. The method as recited in claim 8 wherein the secure peer-to-peer transactions are selected from a group comprising one or more of the following:
   instant messaging;
   file sharing;
   application sharing;
   data sharing; and
   photo sharing.

10. One or more computer readable media comprising computer executable instruction that when executed by a computer direct the computer to perform a method comprising:

executing a messaging module to communicate with another computer;

in response to executing the messaging module, generating a bundled request for a token and a short-lived certificate (SLC) using an extended web service trust protocol, wherein the extended web service trust protocol comprises a web service trust protocol for token requests that is extended with syntax that permits a request for an SLC, such that the extended web service trust protocol supports bundled requests for a token and an SLC;

communicating the bundled request to an authentication service, wherein the bundled request is authenticated by the authentication service using client credentials;

in response to the bundled request, receiving a particular token and a particular SLC, wherein the particular SLC is configured to establish a secure peer-to-peer communications channel;

presenting the particular token as proof of identity at any of a plurality of service providers without needing additional authentication at said providers;

using the particular SLC and an additional SLC received at the another computer to establish a secure peer-to-peer communications channel between the computer and the another computer without the authentication service validating the particular SLC received at the computer and the additional SLC received at the another computer; and sharing data with the another computer via the secure peer-to-peer communications channel.

11. The one or more computer readable media of claim 10, wherein the secure peer-to-peer communications channel is established automatically when an instant messaging session is initiated.

12. The one or more computer readable media of claim 10, wherein the secure peer-to-peer communications channel is established upon selection of a secure sharing option from a user interface.

13. The one or more computer readable media of claim 10, wherein the method further comprises providing a security indicator to indicate whether the secure peer-to-peer communications channel is established.

14. The one or more computer readable media of claim 10, wherein the method further comprises displaying a scale of security textually or graphically.

15. The one or more computer readable media of claim 10, wherein the secure peer-to-peer communications channel supports secure peer-to-peer transactions comprising instant messaging, file sharing, application sharing, data sharing, photo sharing, or combinations thereof.

16. The one or more computer readable media of claim 10, wherein the particular SLC is based upon a configurable policy which defines one or more of a certificate validity period, certificate type, key type, key length, key usage, extended key usage, policy id, user notice, clock skew, or certificate signing period.

17. The one or more computer readable media of claim 10, wherein the SLC includes an expiration time that defines a validity period and the SLC is automatically revoked when the expiration time passes.

18. The one or more computer readable media of claim 10, wherein the method further comprises providing a plurality of sharing options via a user interface.

19. The one or more computer readable media of claim 18, wherein the sharing options include share, secured sharing, select files, share applications, share images, share desktop, or combinations thereof.

20. The one or more computer readable media of claim 18, wherein the sharing options are shown on the user interface in a menu bar, in a side bar, as individual buttons, or combinations thereof.

* * * * *